May 30, 1967  A. O. JANSSON ET AL  3,321,813
COMBINATION METAL AND PLASTIC MEMBERS
Filed Dec. 11, 1964
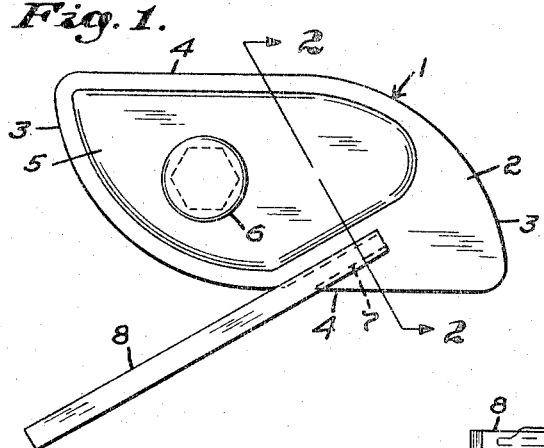
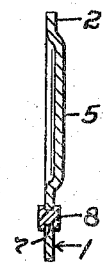
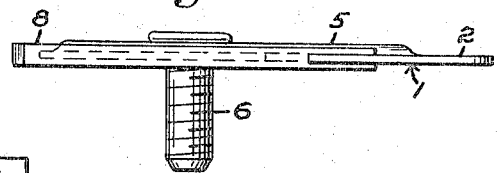
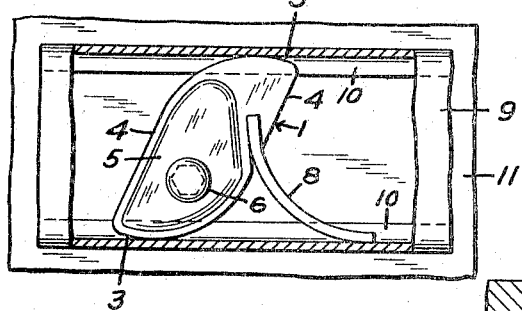
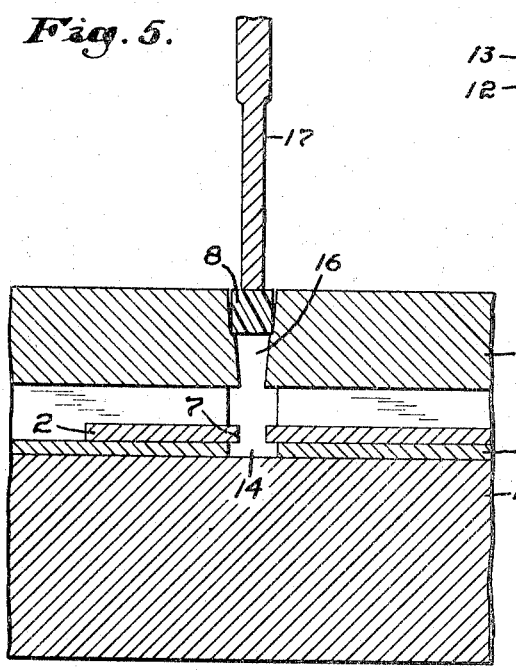
Inventors:
Arnold O. Jansson &
George D. Pickering,
by Philip E. Parker
Atty.

United States Patent Office 3,321,813
Patented May 30, 1967

3,321,813
COMBINATION METAL AND PLASTIC MEMBERS
Arnold O. Jansson and George D. Pickering, Arlington, Mass., assignors to United-Carr Incorporated, Boston, Mass., a corporation of Delaware
Filed Dec. 11, 1964, Ser. No. 417,716
1 Claim. (Cl. 24—73)

This invention relates generally to a combination metal and plastic fastener. More specifically, the invention concerns a combination metal and plastic fastener adapted to secure a molding to a support or workpiece.

An object of the invention is to provide a simple, inexpensive fastener which will securely engage a molding and the supporting vehicle to which the molding is to be affixed.

A further object is to provide a simple, inexpensive, easily assembled molding fastener comprising metal and plastic elements.

Another object of the invention is to provide a fastener which can readily be moved laterally within a molding for alignment of the fastener with prelocated apertures in a support or workpiece.

Other objects and advantages of the novel fastener will become evident from a reading of the following detailed description in conjunction with a viewing of the accompanying drawing in which:

FIG. 1 is a top plan view of a molding fastener according to the invention;

FIG. 2 is a section taken on line 2—2 of FIG. 1;

FIG. 3 is a side elevation of the fastener shown in FIG. 1;

FIG. 4 is an installation partly in section showing the fastener securing a molding to a support; and FIGS. 5 and 6 are sectional views illustrating the method of coupling the metal and plastic elements of the fastener including appropriate tools for accomplishing same.

The invention is illustrated in the form of a simple side wing molding fastener as a convenient vehicle of disclosure.

Referring specifically to FIGS. 1–4 the fastener 1 includes a metal cross plate 2 having generally eccentric, arcuate ends 3 and parallel peripheral edges 4. The inner portion of the cross plate 2 is embossed at 5 and has a threaded fastener member 6 attached to and depending therefrom as best shown in FIG. 3. Additionally the cross plate 2 has a generally rectangular slot 7 cut therein adjacent to and extending angularly inwardly from one of the edges 4.

As best depicted in FIGS. 1 and 2 a spring arm 8 shown to be of a plastic material, for example, polypropylene, is seated partially within the slot 7 and extends outwardly therefrom at an angle with respect to the cross plate 2. The thickness of the spring arm 8 is greater than the thickness of the cross plate 2 and the width of the spring arm is greater than that of the slot 7. Portions of the spring arm 8 are compressed between the internal edges of the plate which define the slot 7, while other portions of the arm 8 overlie the surfaces of the cross plate adjacent the slot on both sides of the cross plate.

FIG. 4 depicts an installation wherein the fastener 1 is employed to secure a hollow molding 9 having inturned flange 10 to a support 11, for example, the body of an automobile or an appliance. As clearly shown therein the arcuate ends 3 of the cross plate 2 span the distance between the inturned flanges 10 of the molding 9 and are continually, rotatably urged into engagement therewith by the spring arm 8, the free end of which engages one of the inturned molding flanges at points spaced from one of the arcuate ends 3 of the cross plate. The threaded fastener 6 passes through an opening in the support 11 and is secured thereto by a standard threaded nut or other separable fastener (not shown) at the side of the support remote from the molding 9.

The reader will appreciate that the novel combination of the metal cross plate and plastic spring arm provides two distinct advantages which are highly desirable in a molding fastener; to wit, a rigid element for firmly supporting and securing the molding, and a smooth, highly flexible spring arm to facilitate slidable adjustment of the fastener within the molding for aligning the threaded member 6 with preformed apertures in a supporting workpiece.

FIGS. 5 and 6 depict the method employed to couple the metal and plastic elements of the fastener including appropriate tools for accomplishing the same.

The tools include a lower die 12 which is secured to and overlies the upper surface of platen 13. The die 12 has a transverse slot 14 which is approximately twice the width of the slot 7 in the cross plate 2. An upper die 15 is secured to the rearward portion of the platen 13 and overlies the lower die 12 in vertically spaced relationship thereto. The upper die 15 likewise has a transverse slot 16 which is widest at its end remote from the lower die 12, and is thereafter beveled inwardly and tapered to its narrowest width at the end in closest proximity of the lower die 12.

The tools also include a punch 17 having a width less than the narrowest portion of the slot 16. The purpose of the punch will be more fully described hereinafter.

In assembling the metal and plastic elements of the fastener the plastic spring arm 8, which may be made of any one of a wide variety of well-known resilient and elastically expansible plastics, for example, polypropylene, is placed in the transverse slot 16 in the upper die 15. The metal cross plate 2, prior to embossing or attaching the fastener member 6, is placed on the lower die 12 such that the slot 7 is in central registration with the slot 14. At this point it should further be noted that the lower end of slot 16, that is, its narrowest portion, is slightly narrower than the slot 7 in the cross plate 2.

The punch 17, which may be manually or mechanically operated, is thence employed to force the plastic element 8 downwardly through the slot 16 so that the plastic is compressed to the width of the narrow end of the last-mentioned slot. Continued downward movement of the punch thereafter forces element 8 in its compressed state through the slot 7 until the lower surface of the element rests on the platen 13, at which point the punch 17 may be withdrawn.

Thus, as best depicted in FIG. 6, the portion of the plastic element 8, which is thicker over-all than the cross plate 2, remains compression within the internal edges of the plate defining the slot 7; while those portions of the plastic element above and below the plate expand to overlie the top and bottom surfaces of the latter adjacent each edge of the slot 7.

In order to fully understand the invention and particularly the method previously discussed the reader should be aware of two important factors:

First, that the compression and seating of the plastic element in the plate are ideally accomplished in the shortest time practically possible, preferably on the order of a fraction of a second; but it is quite obvious that the timing is controlled by the degree of elasticity of the plastic element.

Secondly, that where plastics having a lower degree of elasticity are employed, the return of those portions of the element 8 above and below the cross plate 2 to their original width does not take place immediately; but occurs over a relative period of elapsed time.

Regardless of the material used, however, one important factor is consistantly applicable and that is that the continuing tendency of the plastic to expand dictates that the strength and holding power of the attachment will increase in proportion to the length of time the respective members remain so engaged.

With respect to the foregoing disclosure it is to be clearly understood that the invention has been described in connection with a molding fastener solely as a convenient and appropriate means of disclosures and it is contemplated that the teachings contained therein might be employed in a number of other applications to include fasteners of many descriptions without departing from the scope of the invention as defined by the following claim.

What is claimed:

A fastener for attaching a hollow molding having spaced inturned flanges to a support, comprising a thin metallic cross plate adapted to engage the inturned flanges of the molding, said cross plate having a generally parallelogrammic configuration including curved ends and parallel peripheral edges, the length and width of said cross plate being respectively greater than and less than the distance between the inturned molding flanges, said cross plate having a slot formed therein which extends angularly inwardly from one of said parallel edges intermediate said curved ends, means for securing said fastener to a support depending from one side of said cross plate, and a yieldable plastic spring finger extending angularly from said cross plate and lying in planes parallel to said cross plate, the width of said finger being greater than the width of said slot and the thickness of said finger being greater than the thickness of said cross plate, portions of one end of said spring finger being seated in said slot, said portions being compressed between the internal edges of said cross plate defining the sides of said slot, other portions of said one end overlying the surfaces of said cross plate adjacent said slot on both sides of said cross plate, said spring finger having a free end opposite said one end adapted to engage one of the inturned flanges of the molding at points spaced from one of said curved ends of said cross plate to rotatably urge said curved ends of said cross plate into a molding flange engaging attitude.

References Cited

UNITED STATES PATENTS

| | | | |
|---|---|---|---|
| 1,765,231 | 6/1930 | Haas | 74—460 |
| 2,870,959 | 1/1959 | Giddings | 230—134 |
| 3,110,069 | 11/1963 | Jones | 24—73 |
| 3,111,750 | 11/1963 | Moore et al. | 29—235 |

FOREIGN PATENTS 682,859  11/1952  Great Britain.

WILLIAM FELDMAN, *Primary Examiner.*

E. SIMONSEN, *Assistant Examiner.*